(Model.)

J. E. SMITH.
Corn Planter.

No. 235,104. Patented Dec. 7, 1880.

Witnesses:
Fred G. Dieterich
W. Littell

Inventor,
James E. Smith,
by A. Snow & Co.
Atty's.

UNITED STATES PATENT OFFICE.

JAMES E. SMITH, OF WILKESBARRE, PENNSYLVANIA.

CORN-PLANTER.

SPECIFICATION forming part of Letters Patent No. 235,104, dated December 7, 1880.

Application filed July 31, 1880. (Model.)

*To all whom it may concern:*

Be it known that I, JAMES E. SMITH, of Wilkesbarre, in the county of Luzerne and State of Pennsylvania, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form a part of this specification.

Figure 1:
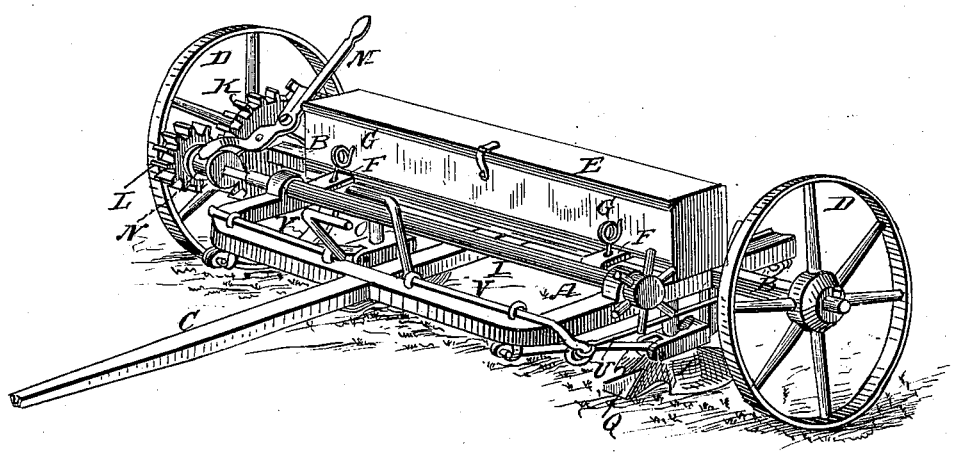
Figure 2:
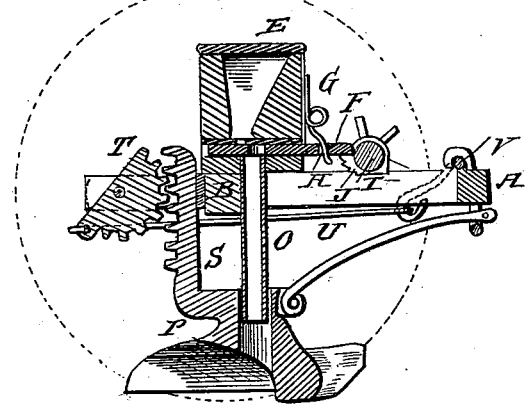
Figure 3:
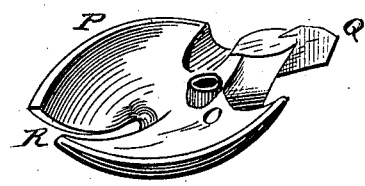

Figure 1 is a perspective view. Fig. 2 is a longitudinal vertical sectional view, and Fig. 3 is a detail view of one of the shoes.

Corresponding parts in the several figures are denoted by like letters of reference.

This invention has relation to improvements in corn-planters; and it consists in the construction and novel arrangement of parts, as hereinafter shown and described.

In the drawings hereto annexed, A represents the frame; B, the axle; C, the tongue, and D D the wheels upon which the axle and the frame of the machine are supported.

The seed-box E rests upon the frame above the axle.

The seeding mechanism consists of two (or more) slides, F, having seed-cups constructed in the usual manner, and arranged in the seed-box or hopper, in which they have a longitudinally-sliding movement. To operate the said seed-slides in a forward direction I employ springs G G, arranged upon the front side of the seed-box or hopper, and having their lower ends adjusted in perforations H in the front ends of the slides, which project beyond the seed-box.

The seeding mechanism consists of a shaft, I, arranged in suitable bearings upon the frame A in front of the seed-box, and provided with cams J J, which, by the rotary movement of the shaft, engage the seed-slides, pushing them in a rearward direction and causing the seed to be dropped. The faces of the cams are notched or serrated, as clearly shown in Fig. 2 of the drawings, thus giving to the slides, when operated, an irregular shaking motion, which causes the grain to drop down into and fill the seed-cups without fail, while clogging and the injury resulting therefrom are prevented.

To the shaft I a rotary movement is imparted by means of a gear-wheel, K, fixed upon the inner side of one of the transporting-wheels D. The said gear-wheel K engages a pinion, L, arranged to slide upon shaft I, so as to be readily engaged with or disengaged from the gear-wheel K by means of a forked lever, M, pivoted to the side of the seed-box, and engaging a grooved collar, N, upon the side of wheel L, said lever being readily operated by the driver, who is seated upon the box.

From the seed-dropping openings in the box or hopper tubes O O project in a downward direction. Upon these tubes slide vertically the furrow-openers, which consist of castings P, provided in front with sharp knives or blades Q, which will cut the old stalks when last year's fields are being planted. The shoes or castings P are concave upon the under side, so that the soil thrown up by the points Q will pass under the said shoes and cover the seed dropped from the seed-tubes, which pass within the said shoes. At their rear ends the said shoes are provided with slits R, which tend to compress the soil compactly around the seed and assist in forming the hills.

The shoes are provided with upward-projecting shanks S, toothed upon the rear side and adapted to slide in suitable openings in the frame, where they engage segmental toothed disks T, journaled in suitable bearings behind the said shanks. The said disks are connected, by pivoted rods U, with crank-levers V, suitably pivoted to the frame of the machine in such a manner as to be readily operated by the driver for the purpose of raising the shoes when obstacles of any kind are to be passed.

From the foregoing description, and by reference to the drawings hereto annexed, the operation and advantages of my invention will be readily understood. It is simple, durable, easily operated, and very convenient for use in all kinds of soil.

I am aware that the adjustable shoes of corn-planters have been provided with vertical toothed shanks, that engage with pivoted toothed disks operated by suitable levers, whereby the vertical adjustment of such shoes is effected. This, however, I do not claim; but,

Having thus described my invention, I claim and desire to secure by Letters Patent of the United States—

The shoe P, having a concaved under surface, perforated for the reception of the seed-tube and provided with toothed shank S, rear slit, R, and forward-projecting knife or blade Q, with notches or openings adjoining said blade on each side, substantially as shown and described.

In testimony that I claim the foregoing as my own I have hereto affixed my signature in presence of two witnesses.

JAMES E. SMITH.

Witnesses:
JACOB F. CHOLLET,
MOSES J. LIVINGSTON.